(12) United States Patent
Ito et al.

(10) Patent No.: US 10,268,179 B2
(45) Date of Patent: Apr. 23, 2019

(54) NC MACHINE TOOL

(71) Applicant: FUJI CORPORATION, Chiryu (JP)

(72) Inventors: Masaharu Ito, Ena (JP); Shinya Kumazaki, Toyota (JP); Kazuyuki Kojima, Toyota (JP)

(73) Assignee: FUJI CORPORATION, Chiryu (JP)

( * ) Notice: Subject to any disclaimer, the term of this patent is extended or adjusted under 35 U.S.C. 154(b) by 28 days.

(21) Appl. No.: 15/303,927

(22) PCT Filed: Apr. 15, 2014

(86) PCT No.: PCT/JP2014/060713
§ 371 (c)(1),
(2) Date: Oct. 13, 2016

(87) PCT Pub. No.: WO2015/159365
PCT Pub. Date: Oct. 22, 2015

(65) Prior Publication Data
US 2017/0038764 A1    Feb. 9, 2017

(51) Int. Cl.
G05B 19/4063    (2006.01)

(52) U.S. Cl.
CPC ......... *G05B 19/4063* (2013.01); *G05B 2219/34494* (2013.01); *G05B 2219/36219* (2013.01); *G05B 2219/37533* (2013.01); *G05B 2219/39068* (2013.01)

(58) Field of Classification Search
CPC ...... G05B 19/4063; G05B 2219/37533; G05B 2219/39068; G05B 2219/36219; G05B 2219/34494
USPC .................................................. 700/159, 17
See application file for complete search history.

(56) References Cited

U.S. PATENT DOCUMENTS

| | | | | |
|---|---|---|---|---|
| 5,148,637 A | * | 9/1992 | Byron | B24B 9/148 451/11 |
| 5,428,547 A | * | 6/1995 | Ikeda | G05B 19/4184 700/174 |
| 5,514,941 A | * | 5/1996 | Kita | B23H 7/04 318/569 |
| 5,517,639 A | * | 5/1996 | Yamaguchi | G06F 11/3419 377/16 |
| 5,732,272 A | * | 3/1998 | Gochee | G06F 9/4425 712/E9.082 |

(Continued)

FOREIGN PATENT DOCUMENTS

| | | | | |
|---|---|---|---|---|
| JP | 7-51994 A | | 2/1995 | |
| JP | H10143220 A | * | 5/1998 | B23Q 15/00 |

(Continued)

OTHER PUBLICATIONS

International Search Report dated Jun. 17, 2014 in PCT/JP2014/080713 filed Apr. 15, 2014.

*Primary Examiner* — Brian W Wathen
*Assistant Examiner* — Mohammed Shafayet
(74) *Attorney, Agent, or Firm* — Oblon, McClelland, Maier & Neustadt, L.L.P.

(57) ABSTRACT

An NC machine tool is provided with a display device capable of displaying processing time individually for each function command of a block of an NC program. The display device of the NC machine tool is capable of displaying processing time for each function command. Thus, an operator is able to identify processing time for each function command via the display device.

6 Claims, 5 Drawing Sheets

| NC program | | Processing time (sec.) | | | | | | | | |
|---|---|---|---|---|---|---|---|---|---|---|
| 00001 (35745-TGB010.OP1) | | Current data | | | Most recent data | | | Initial data | | |
| 7 | G0X120. 85Z100. T101S220M4; | 3.45 | | | 3.45 | | | 3.45 | | |
| | | G0 | T101 | S220 | G0 | T101 | S220 | G0 | T101 | S220 |
| | | 2.1 | 0.1 | 3.46 | 1.0 | 0.1 | 3.45 | 1.0 | 0.1 | 3.45 |

(56) References Cited

U.S. PATENT DOCUMENTS

| | | | | |
|---|---|---|---|---|
| 5,774,718 A * | 6/1998 | Aoshima | G06F 9/4881 | 714/E11.196 |
| 5,889,669 A * | 3/1999 | Kagami | G05B 19/058 | 700/11 |
| 6,332,212 B1 * | 12/2001 | Organ | G06F 11/323 | 714/E11.181 |
| 6,530,031 B1 * | 3/2003 | Randall | G06F 1/14 | 710/10 |
| 6,625,498 B1 * | 9/2003 | Kurakake | G05B 19/0421 | 700/19 |
| 7,653,899 B1 * | 1/2010 | Lindahl | G06F 11/3612 | 717/125 |
| 7,961,087 B2 * | 6/2011 | Hoveida | G06F 11/3072 | 340/500 |
| 8,015,566 B2 * | 9/2011 | Lefurgy | G06F 1/3228 | 718/104 |
| 8,752,028 B2 * | 6/2014 | Bird | H04L 43/14 | 717/127 |
| 2002/0174164 A1 * | 11/2002 | Hayashi | G06F 9/4887 | 718/102 |
| 2003/0110006 A1 * | 6/2003 | Nakamura | G05B 19/406 | 702/176 |
| 2003/0195642 A1 * | 10/2003 | Ragnini | G05B 19/409 | 700/56 |
| 2003/0196031 A1 * | 10/2003 | Chen | G06F 12/0873 | 711/104 |
| 2004/0210338 A1 * | 10/2004 | Ogawa | G05B 19/408 | 700/174 |
| 2005/0229176 A1 * | 10/2005 | Findeisen | G06F 11/3423 | 718/100 |
| 2006/0212867 A1 * | 9/2006 | Fields | G06F 11/3423 | 718/100 |
| 2006/0218558 A1 * | 9/2006 | Torii | G06F 9/4887 | 718/107 |
| 2006/0248401 A1 * | 11/2006 | Carroll | G06F 11/3423 | 714/38.1 |
| 2008/0009311 A1 * | 1/2008 | Nam | G06F 3/0481 | 455/550.1 |
| 2010/0073315 A1 * | 3/2010 | Lee | G06F 1/1626 | 345/173 |
| 2011/0068945 A1 * | 3/2011 | West | G09G 5/14 | 340/691.6 |
| 2012/0159259 A1 * | 6/2012 | Klein | G06F 11/0757 | 714/38.1 |
| 2013/0268108 A1 * | 10/2013 | Ogawa | G05B 19/4065 | 700/174 |
| 2014/0032977 A1 * | 1/2014 | Myrah | G06F 11/3419 | 714/47.2 |

FOREIGN PATENT DOCUMENTS

| | | |
|---|---|---|
| JP | 2003-175439 A | 6/2003 |
| JP | 2004-62613 A | 2/2004 |

* cited by examiner

| NC program | Current data | | | Most recent data | | | Initial data | | |
|---|---|---|---|---|---|---|---|---|---|
| O0001 (35745-TGB010.0P1) | Processing time (sec.) | | | | | | | | |
| | 5.54 | | | 3.45 | | | 3.45 | | |
| | G0 | T101 | S220 | G0 | T101 | S220 | G0 | T101 | S220 |
| 7 G0X120. 85Z100. T101S220M4; | 1.0 | 0.1 | 5.45 | 1.0 | 0.1 | 3.45 | 1.0 | 0.1 | 3.45 |

FIG. 3

| NC program | Current data | | | | | Most recent data | | | | | Initial data | | | | |
|---|---|---|---|---|---|---|---|---|---|---|---|---|---|---|---|
| O0001 (35745-TGB010.0P1) | 3.45 | | | | | 3.45 | | | | | 3.45 | | | | |
| | G0 | T101 | S220 | | | G0 | T101 | S220 | | | G0 | T101 | S220 | | |
| | 2.1 | 0.1 | 3.46 | | | 1.0 | 0.1 | 3.45 | | | 1.0 | 0.1 | 3.45 | | |
| 7 G0X120. 85Z100. T101S220M4; | | | | | | | | | | | | | | | |

Processing time (sec.)

*FIG. 6*

NC MACHINE TOOL

TECHNICAL FIELD

The present application relates to an NC (numerical control) machine tool that performs specified processing on work.

BACKGROUND ART

Patent literature 1 discloses an NC machine tool that displays actual operating time for each block of an NC program. According to the NC machine tool of this patent literature, an operator is able to check the actual operating time for each block.

CITATION LIST

Patent Literature

PTL1: JP-A-2003-175439

SUMMARY

However, there are cases in which a single block of an NC program contains multiple function commands. For the NC machine tool of the above patent literature, an operator is unable to identify the processing time for each function command individually. For example, in a case in which a T code (code related to tool specification or the like) and an S code (code related to spindle rotation speed or the like) are arranged in a single block, the operator is unable to identify the processing time for the T code and S code individually. Thus, an object of the present disclosure is to provide an NC machine tool that enables an operator to recognize a processing time of each function command individually.

(1) To solve the above problem, the present disclosure of an NC machine tool is provided with a display device capable of displaying processing time individually for each function command of a block of an NC program. A display device of the NC machine tool of the present disclosure is capable of displaying processing times for each function command. Thus, an operator is able to identify processing time for each function command via the display device.

(2) The configuration from (1) above maybe provided with a memory section that memorizes data related to the processing time. Here, "data related to processing time" includes items such the processing time itself, processing start time, and processing finish time. According to this configuration, data is able to be saved in the memory section.

(3) The configuration from (2) above may be such that, when the NC program is performed, the memory section is capable of memorizing the data, and of memorizing old data and new data, and the display device may be capable of displaying the old data and the new data simultaneously. According to this configuration, an operator is able to compare old data and new data for each function command via the display device.

(3-1) The configuration from (3) above may be such that the overall number of times the NC program is performed is N times (N is an integer and 3≤N), the number of times that the NC program has been performed to this point is n times (n is an integer and 1≤n≤N), the data up until number of times performing from the first time to the k-th number of times (k is an integer and 1≤k≤N−1 is initial data, the data for which the number of times performing is n−1 number of times is most recent data, and data for which the number of times performing is the n-th number of times is current data; old data is initial data and most recent data; new data is the current data. According to this configuration, at least one of initial data and most recent data is able to be compared with current data.

(4) The configuration from (2) or (3) above may be such that the data is able to be outputted from the memory section to a separate storage media. According to this configuration, for example, in a case in which there are multiple NC machine tools that share the same NC program and work, it is possible to easily compare data between multiple NC machine tools. Also, data can be shared between multiple NC machine tools.

Also, for example, in a case when replacing an NC machine tool with one of the same type, and performing processing on the same work with the same NC program, data can be carried over from the old NC machine tool to the new NC machine tool.

(5) The configuration according to any one of (1) to (4) above may also be provided with a calculating section that calculates the processing time. According to this configuration, calculation of processing time can be performed automatically.

(5-1) The configuration of (5) above may be such that the calculating section compares the old data and the new data, and the display section is able to display abnormalities with the new data based on the comparison result of the calculating section. According to this configuration, abnormalities with the new data with respect to the old data can be displayed.

EFFECTS

According to the present disclosure, it is possible to provide an NC machine tool that enables an operator to recognize a processing time of each function command individually.

BRIEF DESCRIPTION OF DRAWINGS

FIG. 3 is a (first) partial view of the same screen.

FIG. 6 is a (second) partial view of the same screen.

DESCRIPTION OF EMBODIMENTS

Figures 1, 2:
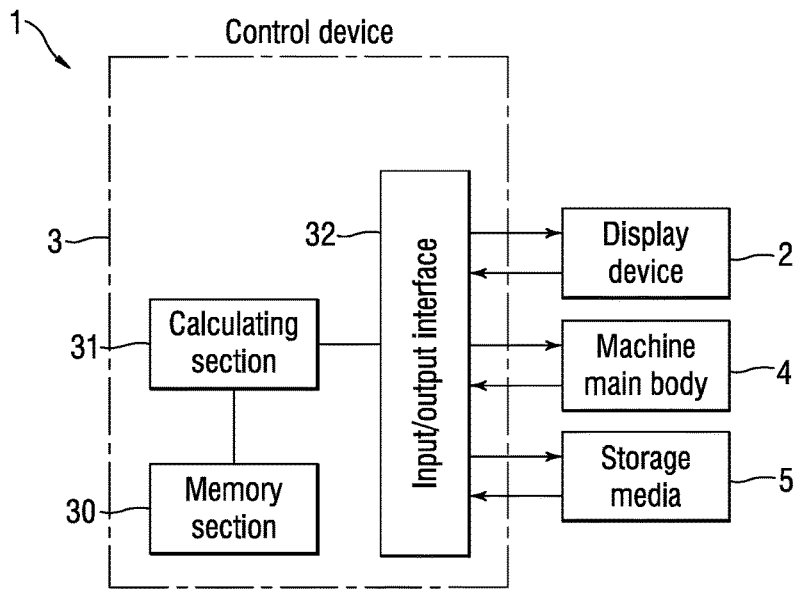
FIG. 1 is a block diagram of an NC machine tool that is an embodiment of the present disclosure.
FIG. 2 is a (first) conceptual diagram of a screen of a display device of the NC machine tool.

Described below is an embodiment of an NC machine tool of the present disclosure. FIG. 1 is a block diagram of an NC machine tool that is an embodiment of the present disclosure. FIG. 2 is a (first) conceptual diagram of a screen of a display device of the NC machine tool. FIG. 3 is a (first) partial view of the same screen.

Configuration of NC Machine Tool

Described first is the configuration of the NC machine tool of the present disclosure. As shown in FIG. 1, NC machine tool of this embodiment is provided with display device 2, control device 3, and machine main body 4. Machine main body is provided with items, not shown, such as a headstock, a turret, an X slide, and a Z slide. Machine main body 4 performs specified processing on a work, which is not shown. Display device 2 is provided with screen 20. Screen 20 is a touchscreen.

Control device 3 is provided with memory section 30, calculating section 31, and input/output interface 32. An NC program for work processing is stored in memory section 30. As shown in FIG. 2, the NC program is configured from multiple blocks (rows). In some cases, multiple function commands (M codes [M66, M57, and so on], G codes [G99, G97, and so on], S codes [S1850, S220, and so on], and T codes [T00, T100, and so on]) are included in a single block. Also stored in memory section 30 are processing start time, processing finish time, and processing time for each function command. Also stored in memory section 30 are most recent data threshold value T1 and initial data threshold value T2. As described later, most recent data threshold value T1 and initial data threshold value T2 are used by calculating section 31 for determining whether a warning is required with respect to the current data.

Control device 3 and display device 2 are electrically connected via input/output interface 32. Two-way communication is possible between control device 3 and display device 2. Control device 3 and machine main body 4 are electrically connected via input/output interface 32. Two-way communication is possible between control device 3 and machine main body 4.

Memory media 5 is able to be connected from outside to input/output interface 32 of control device 3. Two-way communication is possible between control device 3 and memory media 5. Thus, information from memory section 30 of control device 3 can be outputted to memory media 5. Conversely, information from memory media 5 can be inputted to memory section 30.

Screen Configuration of Display Device

Described next is the screen configuration of the display screen of the NC machine tool of the embodiment. As shown in FIG. 2, control device 3 is able to display an NC program on screen 20. Control device 3 is able to display processing times (current data, most recent data, initial data) for each block on screen 20. Current data, most recent data, and initial data are described in detail later.

The processing times of blocks displayed on screen 20 are described below. Among the multiple function commands in a single block are those that are capable of being performed independently. Between multiple function commands, in a case in which the actuator (servo motor, hydraulic cylinder, and so on) used is different, the multiple function commands can be performed independently. In this case, calculating section 31 performs the multiple function commands in parallel.

Also, among the multiple function commands, there are those that are not capable of being performed independently. That is, between multiple function commands, in a case in which the actuator used is shared, the multiple function commands cannot be performed independently. In this case, calculating section 31 performs each of the multiple function commands in order one by one.

In this manner, processing time of a given block is the difference between, from among all the multiple function commands included in the block, the processing finish time of the function command that is completed last, and the processing start time of the function command that is started earliest.

Information that an operator is able to check from screen 20 shown in FIG. 2 is only the overall processing time for a given block. If the operator wishes to know more detailed information (the breakdown of processing time), they must touch the block number on screen 20 shown in FIG. 2. When the operator touches the screen, control device 3 opens the corresponding block. FIG. 3 shows a case in which the operator touched block number "7" in FIG. 2.

As shown in FIG. 3, control device 3 is able to display processing times (current data, most recent data, initial data) for each function command (G0, T101, S220) on screen 20. Note that, the contents of function command "G0" (in full, G0X120.85Z100) are "move X slide to position 120.85 mm and move Z slide to position 100 mm with fast indexing." The contents of function command "T101" are "rotate (change the angle of) tool rest of turret such that tool T1 is at the usage position, and use correction value "01" when using tool T1." The contents of function command "S220" (in full, S220M4) are "rotate the spindle in the reverse direction at a speed of 220 rpm."

Control device 3, in a case in which the current data is way off with respect to at least one of the initial data and the most recent data, is able to display a warning about the current data. For example, in FIG. 3, for function command "S220," current data "5.54" deviates greatly from initial data "3.45" and most recent data "3.45" (meaning that processing time has lengthened). Thus, control device 3 displays a warning (hatching pattern) on the current data. Also, as in FIG. 2, control device 3 displays a warning for the current data of the seventh block.

Work Production Method

Described next is the work production method using the NC machine tool of the embodiment. NC machine tool 1 produces a specified quantity of work by repeatedly performing the NC program shown in FIG. 2. The number of times that the NC program is repeated (the cycle count) corresponds to the production quantity of the work. In the embodiment, the repeat performing quantity is N times (N is an integer and $3 \leq N$). That is, the production quantity of the work is N pieces.

Figure 4:
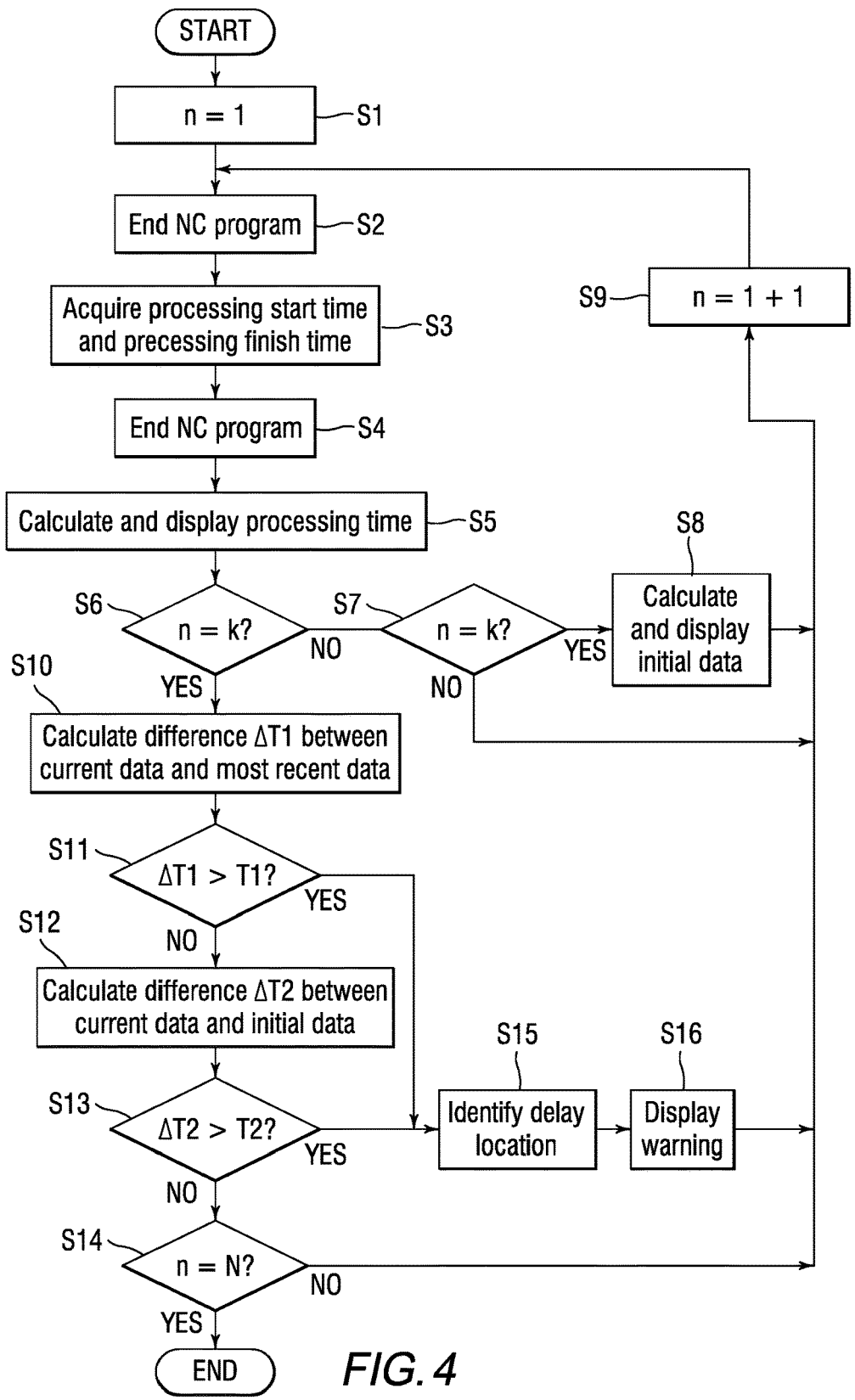
FIG. 4 is a flow chart of the work production method.

The work production method includes an initial data calculating step, and a data comparison step. FIG. 4 shows a flow chart of the work production method. In FIG. 4, n (n is an integer and $1 \leq n \leq N$) represents the number of times the current NC program is performed (the cycle count). k (k is an integer and $1 \leq k \leq N-1$) represents the number of times that the NC program needs to be repeated (the cycle count) in order to acquire the initial data.

Initial Data Calculating Step

In the initial data calculating step, the NC program is performed repeatedly k times using a new NC machine tool 1. That is, k pieces of work are produced. Then, the initial data is calculated.

Calculating section 31 shown in FIG. 1 makes the counter of the current cycle count n "1" (S1 in FIG. 4 [S1 is referred to as step 1, with similar labeling applying to the other steps]) and starts the NC program (S2 in FIG. 4). Calculating section 31 performs the NC program shown in FIG. 2 from the top row to the bottom row for each block in order. While the NC program is being performed, memory section 30 acquires the processing start time and the processing finish time of each function command from machine main body 4 (S3 in FIG. 4).

Specifically, when a given function command is performed, control device 3 sends a code reading signal to machine main body 4. Memory section 30 saves the occurrence time of the code reading signal as the processing start time of the function command. Also, when the function command has been completed, machine main body 4 sends a code finish signal to control device 3. Memory section 30 saves the occurrence time of the code completed signal as the processing finish time of the function command.

When the NC program is complete (S4 of FIG. 4), calculating section 31 calculates the processing time based on the processing start time and the processing end time of memory section 30 (S5 of FIG. 4). Specifically, calculating section 31 calculates the difference between the processing finish time and the processing finish time for each function command. Memory section 30 saves each calculated processing time for each function command.

Also, calculating section 31 displays the calculated processing times on screen 20 (S5 in FIG. 4). Specifically, calculating section 31 displays the current data (processing time of each function command of the n-th cycle count [the count this time]) on screen 20. As shown in FIG. 2, calculating section 31 is capable of displaying current data by individual block. Also, as shown in FIG. 3, calculating section 31 is capable of displaying current data by individual function command.

When the current cycle count n is k−1 or lower (S6 and S7 of FIG. 4), calculating section 31 counts up just one of the current cycle count n (S9 of FIG. 4). Then, calculating section 31 performs the NC program again. That is, while the current cycle count n is k−1 or lower, calculating section 31 repeatedly performs S2 to S9 of FIG. 4. Note that, when the current cycle count is two or later, calculating section 31, in addition to the current data, displays the processing time of each function command of the most recent data (cycle count n−first time [that is, the previous time]) (S5 of FIG. 4) on screen 20. As shown in FIG. 2, calculating section 31 is able to display the most recent data in individual blocks. Also, as shown in FIG. 3, calculating section 31 is able to display most recent data by individual function command.

When the current cycle count n reaches k (S7 of FIG. 4), calculating section 31 calculates the initial data (S8 of FIG. 4). Specifically, calculating section 31 calculates an average value of the processing time for each function command. That is, the processing time for cycle count quantity k is stored in memory section 30 for each function command. Calculating section 31 calculates an average value of k quantity of processing times for each function command. The average value is the initial data. Memory 30 saves the average value, that is, the initial data.

Also, calculating section 31 displays the calculated initial data on screen 20 (S8 in FIG. 4). Specifically, calculating section 31 displays the initial data on screen 20. As shown in FIG. 2, calculating section 31 is able to display the initial data in individual blocks. Also, as shown in FIG. 3, calculating section 31 is able to display initial data by individual function command. Consequently, calculating section 31 counts up the current cycle count n by 1 (S9 of FIG. 4)

Data Comparing Step

In the data comparing step, the new data (current data) and the old data (most recent data, initial data) are compared for each function command. If there is a large difference between the two data, calculating section 31 displays a warning on screen 20.

With calculating section 31 shown in FIG. 1, when the current cycle count n reaches k+1 (S6 in FIG. 4), after that, difference $\Delta T1$ between the current data and the most recent data is calculated (S10 of FIG. 4). Then, calculating section 31 compares difference $\Delta T1$ with the threshold value T1 for most recent data stored in memory section 30 (S11 of FIG. 4).

With respect to the comparison result for a given function command, if difference $\Delta T1$ exceeds threshold value Ti for the most recent data, this determines the delay location (S15 in FIG. 4). Then, as with current data function command "S220" shown in FIG. 3, a warning is displayed on screen 20 (S16 FIG. 4). An operator can thus recognize that the cause of the delay for the seventh block is function command "S220" simply by looking at screen 20.

Note that, function command "S220" is a function command related to the rotation speed of the spindle of machine main body 4. Thus, an operator is able to make an estimate as to what the problem is with the rotation drive mechanism (servo motor, speed reducer, or the like) of the spindle simply by looking at screen 20.

With respect to the comparison result from S11 in FIG. 4 for a given function command, if difference $\Delta T1$ is most recent data threshold value T1 or less, calculating section 31 shown in FIG. 1 calculates difference $\Delta T2$ between the current data and the initial data (S12 in FIG. 4). Then, calculating section 31 compares difference $\Delta T2$ with the threshold value T2 for initial data stored in memory section 30 (S13 of FIG. 4).

As for the comparison result, for a given function command, if difference $\Delta T1$ exceeds threshold value Ti for the most recent data, this determines the delay location (S15 in FIG. 4). Then, as with current data function command "S220" shown in FIG. 3, a warning is displayed on screen 20 (S16 FIG. 4). An operator can thus recognize that the cause of the delay for the seventh block is function command "S220" simply by looking at screen 20.

Note that, function command "S220" is a function command related to the rotation speed of the spindle of machine main body 4. Thus, an operator is able to make an estimate as to what the problem is with the rotation drive mechanism (servo motor, speed reducer, or the like) of the spindle simply by looking at screen 20.

Calculating section 31 shown in FIG. 1, when the current cycle count n reaches N (S14 of FIG. 4), that is when the work production quantity reaches N, completes production of work. In this manner, according to NC machine tool 1 of the embodiment, an operator is able to perform production of work while comparing new data (current data) and old data (most recent data, initial data).

Effects

Described next are the effects of the NC machine tool of the embodiment. As shown in FIG. 3, display device 2 of NC machine tool 1 of the embodiment is able to display processing times for each function command. Thus, an operator is able to identify processing time for each function command using display device 2. Therefore, it is easy for the operator to identify the state of individual components of machine main body 4. Accordingly, it is possible to effectively perform preventive maintenance on machine main body 4.

Also, as shown in FIG. 1, control device 3 is provided with memory section 30. Thus, it is possible to save data related to processing times (processing time, processing start time, processing finish time, or the like) acquired by control device 3.

Also, as shown in FIG. 3, display device 2 is able to display new data (current data) and old data (most recent data, initial data) at the same time. Thus, an operator is able to compare old data and new data for each function command by using display device 2.

Also, as shown in FIG. 3, display device 2 is able to display current data, most recent data, and initial data at the same time. Thus, an operator is able to compare current data (data from this time) and most recent data (data from last time) for each function command by using display device 2. Also, the operator is able to compare current data (data from this time) and initial data (data from when NC machine tool 1 was new) for each function command by using display device 2. Also, as shown in FIG. 1, control device 3 is provided with calculating section 31. Thus, as shown in S5 of FIG. 4, it is possible to automatically calculate processing time.

Also, as shown in S10 to S13, S15, and S16 of FIG. 4, calculating section 31 is able to compare current data with most recent data and initial data. Further, as shown in FIGS. 2 and 3, calculating section 31 is able to display abnormalities with current data on screen 20. Thus, an operator is able to recognize the reason for delay in a given block, and the reason for delay in the cycle time when producing work simply by looking at screen 20.

Also, already acquired initial data is stored in memory section 30 shown in FIG. 1. Thus, it is possible to transfer initial data when using the same type of NC machine tool 1 and same NC program to produce the same work in the future.

Also, the current data, most recent data, and initial data is stored in memory device 30 shown in FIG. 1. Thus, these data are able to be held externally by storage media 5. Also, in a case in which there are multiple NC machine tools 1 that share the same NC program and work, it is possible to easily compare data between multiple NC machine tools 1. Also, data can be shared between multiple NC machine tools 1.

Also, for example, in a case when replacing an NC machine tool 1 with one of the same type, and performing processing on the same work with the same NC program, data can be carried over from the old NC machine tool 1 to the new NC machine tool 1.

Figure 5:
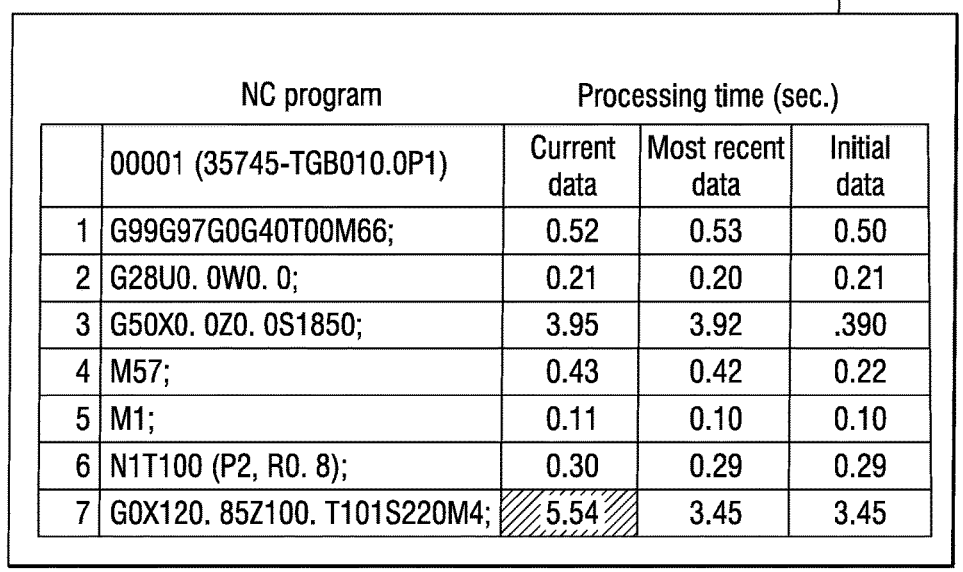
FIG. 5 is a (second) conceptual diagram of a screen of the display device of the NC machine tool.

Further, according to NC machine tool 1 of this embodiment, even in a case in which there is no delay in a given block (in a case in which there is no delay in the cycle time when producing work), it is possible to recognize a function command for which processing time has lengthened. FIG. 5 is a (second) conceptual diagram of a screen of the display device of the NC machine tool. FIG. 5 corresponds to FIG. 2. FIG. 6 is a (second) partial view of the same screen. FIG. 6 corresponds to FIG. 3.

As shown in FIGS. 2 and 3 mentioned above, for the seventh block, three function commands ("G0X120.85Z100.," "T101," and "S220M4") are performed in parallel. Here, the processing time for function command "S220M4" is usually longer than that for the other function commands ("G0X120.85Z100." and "T101"). Thus, as shown in FIGS. 2 and 3, lengthening of the processing time for function command "S220M4" easily leads to a lengthening of the processing time for the block overall. Therefore, it is easy for an operator to recognize lengthening in the processing time for function command "S220M4." In contrast, lengthening of the processing time for the other functions, "G0X120.85Z100." and "T101," does not easily lead to a lengthening of the processing time for the block overall. Therefore, it is easy for an operator to overlook lengthening in the processing time for the other function command "G0X120.85Z100." and "T101."

However, as shown in FIG. 6, control device 3 is able to display the processing time for each function command on screen 20. Thus, the operator can easily recognize lengthening in the processing time for function command "G0X120.85Z100.."

Also, as in FIG. 5, control device 3 displays a warning for the current data of the seventh block. That is, just looking at FIG. 5, the current data for the seventh block is not greatly deviated with respect to the most recent data or initial data. However, control device 3, in order to notify the operator of the lengthening of the processing time for function command "G0X120.85Z100.," displays a warning for the current data of the seventh block. Thus, the operator, by touching block number "7" in FIG. 5 in order to display the details shown in FIG. 6 on screen 20, is able to recognize the lengthening of the processing time of function command "G0X120.85Z100."

Note that, the operator is able to recognize lengthening of the processing time of function command "T101" in a similar manner to recognizing lengthening of the processing time of function command "G0X120.85Z100.."

In this way, by using NC machine tool 1 of this embodiment, even if there is lengthening of the processing time of a function command that does not influence the processing time of the block, it is easy for the operator to recognize the lengthening of the processing time. That is, data on screen 20 shown in FIGS. 5 and 6 is extremely useful for preventive maintenance of NC machine tool 1.

Other Embodiments

Described above is an NC machine tool which is an embodiment of the present disclosure. However, embodiments are not limited to the above-described embodiments. People skilled in the art may implement various modified or improved embodiments.

For example, the processing times of function commands may be displayed on screen 20 shown in FIG. 3 at code level. For example, function command "G99," function command "G97," function command "G0," and function command "G40" are included in the first block shown in FIG. 2. In screen 20 shown in FIG. 3, these function commands may be displayed all together as function command "G codes." Then, among function command "G99," function command "G97," function command "G0," and function command "G40," the difference between the processing finish time of the function command that is completed last, and the processing start time of the function command that is started earliest may be displayed as the processing time.

Alternatively, on screen 20 shown in FIG. 3, processing times of function commands may be displayed in a timing chart, a graph (a line graph, a histogram, or the like) or the like. This would enable an operator to easily recognize trends in time series data.

Also, for screen 20 shown in FIGS. 2 and 3, the display method for warnings with respect to current data is not particularly limited. Any kind of discernible difference that distinguishes a normal value ($\Delta T1 \leq T1$ in S11, and $\Delta T2 \leq T2$ in S13 in FIG. 4) and an abnormal value ($\Delta T1 > T1$ in S11, and $\Delta T2 > T2$ in S13 in FIG. 4) may be used, such as character font, thickness, position, size, transparency, shade, or color. Alternatively, the abnormal value only may selectively flash.

Also, as a method for displaying warnings with respect to current data, calculating section 31 shown in FIG. 1 may specifically display the problem location within machine main body 4 (the location which is the likely cause of the delay) on screen 20 shown in FIGS. 2 and 3. For example, for the current data shown in FIG. 3, the processing time of function command "S220," which is related to rotation speed of the spindle, is long. Thus, calculating section 31 may display "rotation drive mechanism of spindle," "servo motor of spindle," or the like on screen 20 as the problem location. In particular, it is easy for calculating section 31 to identify the problem location in a case in which the new data (current data) greatly deviates from the old data (most recent data and initial data) for function commands belonging to the same code (G code, S code, M code, T code and so on) (S11 and S13 in FIG. 4).

Also, for the work production method, initial data may be updated periodically. That is, the initial data calculating steps (S1 to S9) of FIG. 4 may be performed periodically.

Also, the type of function commands displayed on screen 20 are not particularly limited. For example, G codes related to moving of the turret or the headstock ("G00" [positioning], "G01" [linear interpolation], "G02" [circular interpolation], "G03" [circular interpolation], and the like), M codes related to rotation of the spindle and opening and closing of the chuck ("M03" [start spindle in forward direction], "M04" [start spindle in reverse direction], "M10" [chuck tightening], "M11" [chuck loosening], and the like), T codes related to specification of the tool and the like, S codes related to rotation speed of the spindle and the like, and F codes related to indexing speed and the like, may be displayed on screen 20.

The type of NC machine tool 1 is not particularly limited. For example, it may be a lathe, a milling machine, a drilling machine, a milling cell, or the like. The type of storage media 5 is not particularly limited. Any type is acceptable so long as it is detachable from control device 3. Also, data transfer of memory section 30 may be performed by connecting control sections 3 of multiple NC machine tools 1 with wires or wirelessly.

REFERENCE SIGNS LIST

1: NC machine tool; 2: display device; 3: control device; 4: machine main body; 5: storage media; 20: screen; 30: memory section; 31: calculating section; 32: input/output interface; T1: most recent data threshold value; T2: initial data threshold value

The invention claimed is:

1. A numerical control (NC) machine tool, comprising:
a control device configured to send a plurality of code reading signals, each code reading signal being sent when a corresponding function command of an NC program is to be performed, and each code reading signal including a processing start time;
a machine main body configured to
receive the plurality of code reading signals from the control device; and
send a plurality of code finish signals to the control device, each code finish signal being sent when the corresponding function command is completed, and each code finish signal including a processing finish time;
a display device; and
a memory, wherein
the control device is further configured to
calculate a plurality of processing times for a first set of function commands of the plurality of the function commands of a block of the NC program at a same time when an actuator used for performing each of the first set of function commands is different, each processing time being a difference between the processing finish time and the processing start time for each function command of the first set of the function commands;
calculate a plurality of average processing times, each average processing time being calculated for each function command of the first set of the function commands of the NC program when the function command has performed k (k is an integer and k≥3) times;
control the display device to display, based on a user's input via a touch screen, each processing time of the plurality of processing times and each average processing time of the plurality of average processing times individually corresponding to each function command of the first set of the function commands, and each previously stored processing time of a plurality of previously stored processing times of a same function command;
control the memory to store the processing times corresponding to each function command of the first set of the function commands that is completed;
compare one of the processing times to one of the previously stored processing times of the same function command;
compare the one of the processing times to one of the average processing times of the same function command; and
control the display device to display a warning when a first difference between the one of the processing times and the one of the previously stored processing times exceeds a first threshold value or when a second difference between the one of the processing times and the one of the average processing times exceeds a second threshold value.

2. The NC machine tool according to claim 1, wherein the stored plurality of processing times is outputted from the memory to a separate storage media.

3. The NC machine tool according to claim 1, wherein the plurality of the processing times is displayed in a timing chart or a graph.

4. The NC machine tool according to claim 1, wherein the NC machine tool is a lathe, a milling machine, a drilling machine, or a milling cell.

5. The NC machine tool according to claim 1, wherein the plurality of processing times is carried over to a new machine tool.

6. The NC machine tool according to claim 1, wherein the control device is further configured to calculate another plurality of processing times for a second set of function commands of the plurality of the function commands in a chronological order when the actuator used for performing the second set of function commands is shared.

* * * * *